June 15, 1937. H. PAXTON 2,084,047
BOX LIDDER
Filed Jan. 18, 1932 4 Sheets-Sheet 2
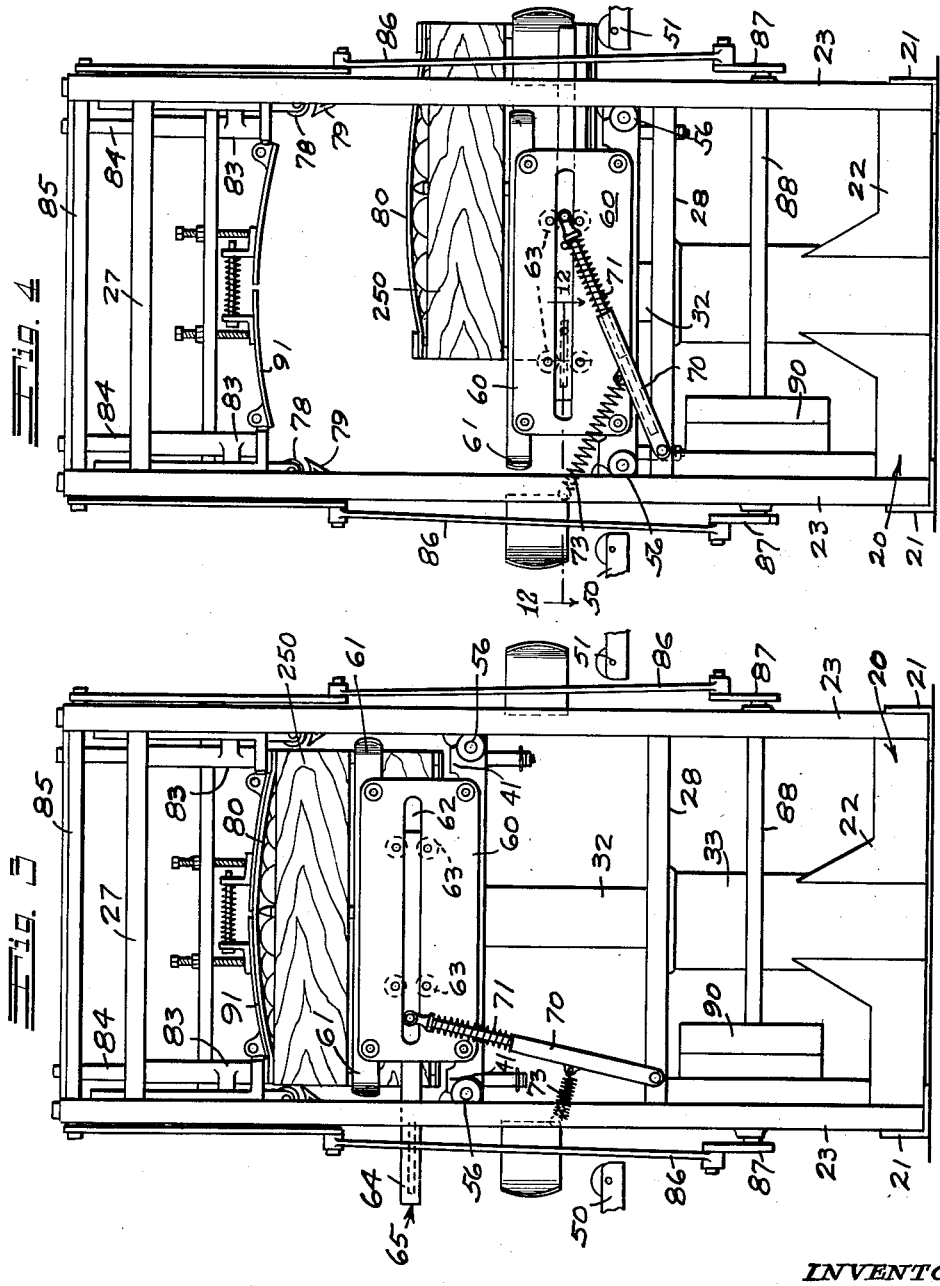
INVENTOR:
Hale Paxton;
By
ATTORNEY.

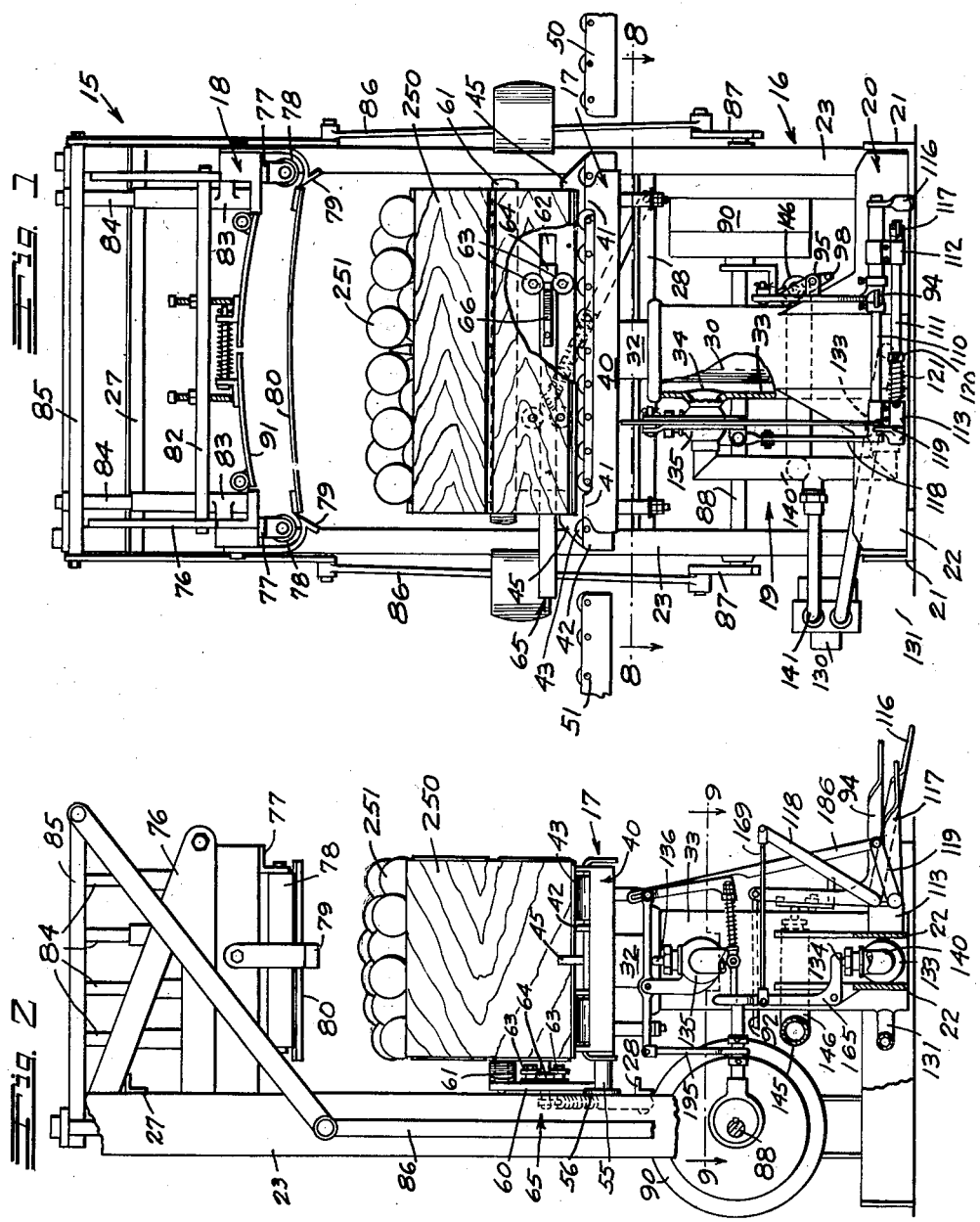

June 15, 1937. H. PAXTON 2,084,047
BOX LIDDER
Filed Jan. 18, 1932 4 Sheets-Sheet 3
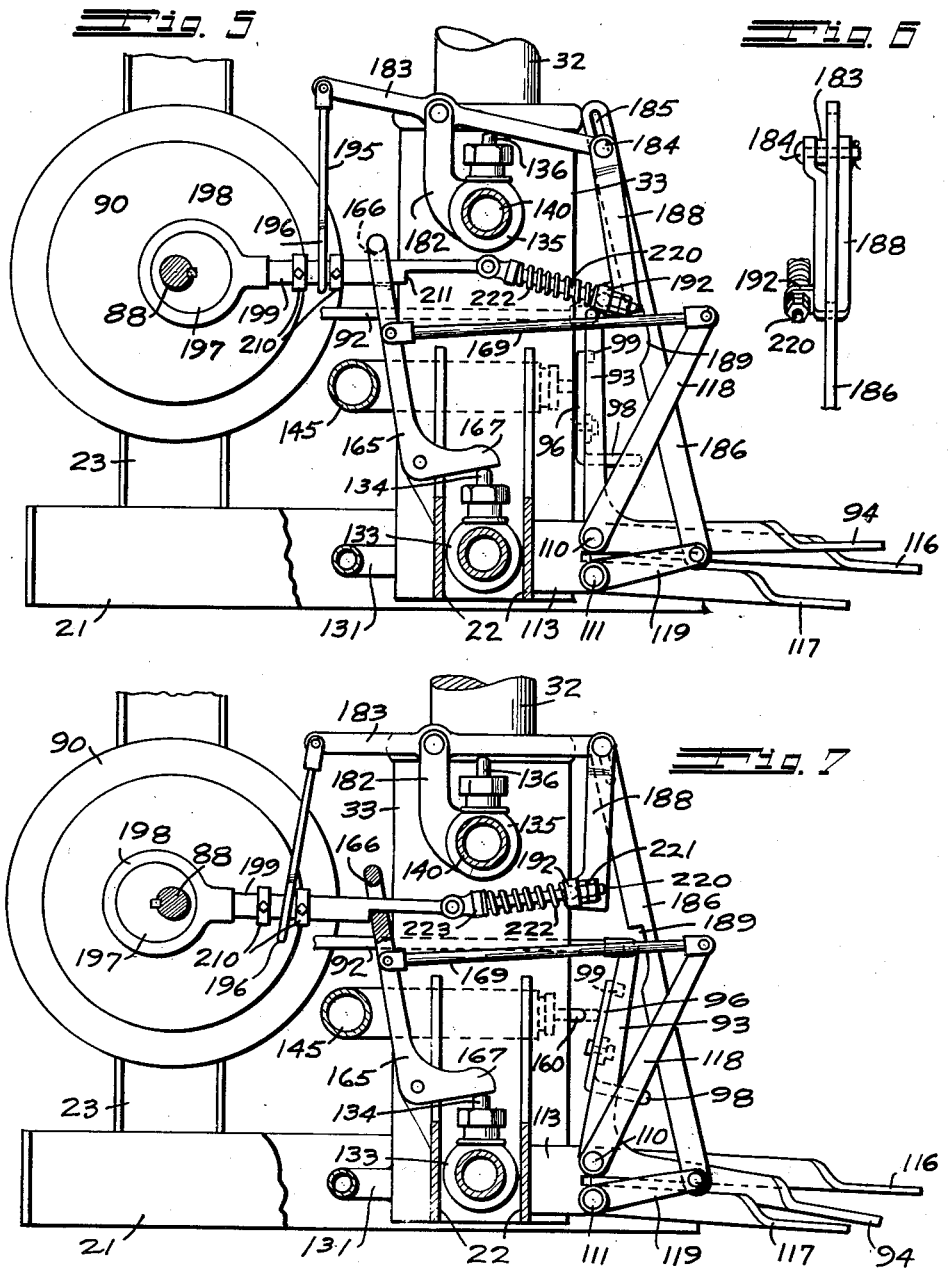
INVENTOR:
Hale Paxton;
By
ATTORNEY June 15, 1937.  H. PAXTON  2,084,047
BOX LIDDER
Filed Jan. 18, 1932  4 Sheets-Sheet 4
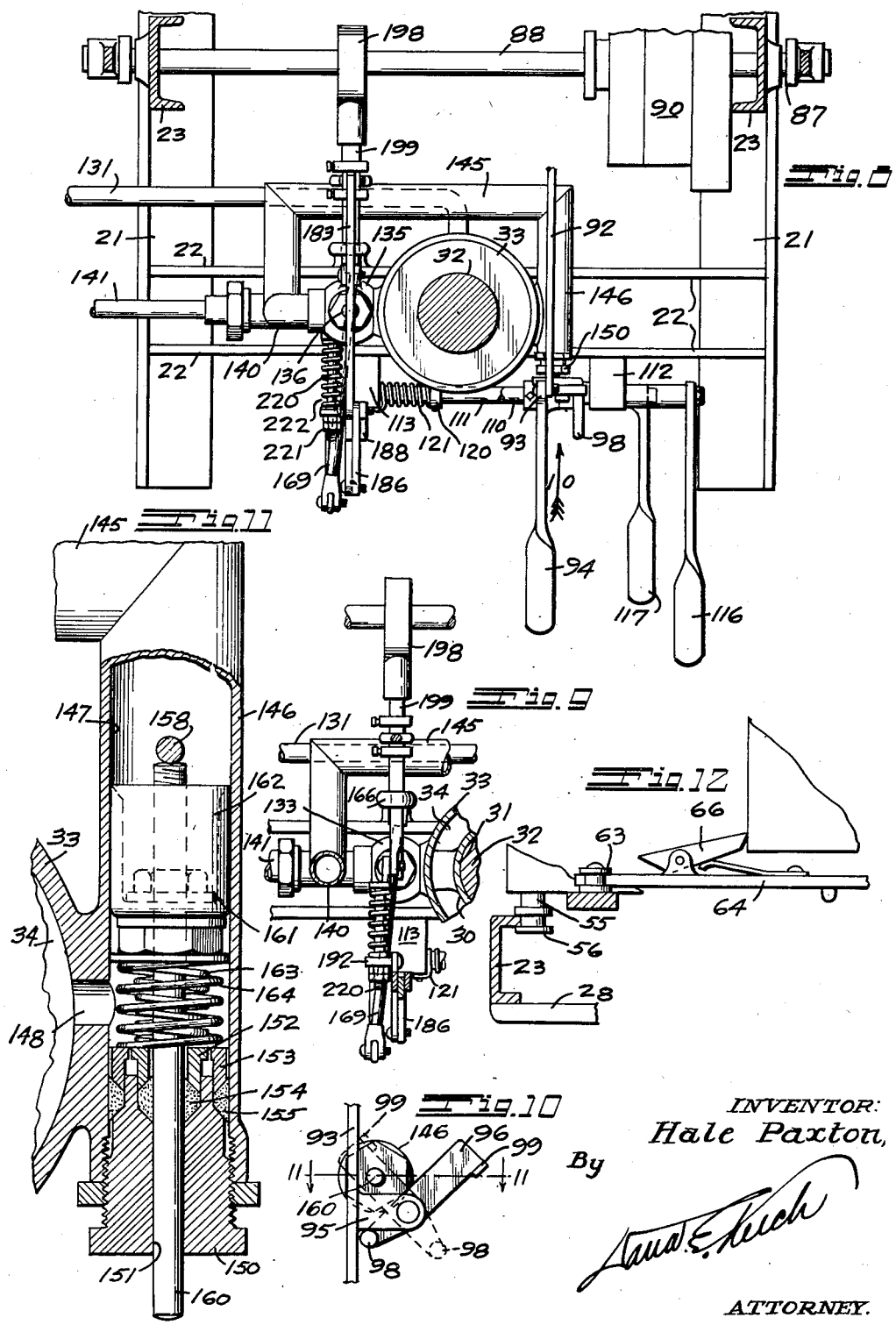

Patented June 15, 1937

2,084,047

UNITED STATES PATENT OFFICE 2,084,047

BOX LIDDER

Hale Paxton, Redlands, Calif., assignor, by mesne assignments, to Food Machinery Corporation, a corporation of Delaware Application January 18, 1932, Serial No. 587,388

9 Claims. (Cl. 1—10)

My invention relates to automatic machinery for securing lids to boxes packed with fresh fruit or the like and particularly to such machines as are manually operated.

While machines have been devised which will automatically lid boxes packed with goods which are contained entirely within the box, it is not practical to use this type of machine for lidding boxes packed with fresh fruit and the like, as it is common custom to pack such boxes with the fruit or other produce extending above the upper edge of the box in what is known as a "crown pack". In lidding boxes thus packed a certain amount of care must be exercised by the operator to prevent the fruit or produce of a similarly perishable nature from being crushed so as to cause this to be destroyed and possibly decay, thus also spoiling other portions of the produce in the box. All the machines devised for lidding boxes packed with fresh fruit and the like, therefore, have been semi-automatic in nature so as to permit the machine to be under the control of the operator to such a degree that he may with certainty avoid letting the fruit get damaged in the machine.

It is an object of my invention to provide an improved machine for semi-automatically securing lids to boxes packed with fresh fruit or the like which will give the operator adequate control over the machine but which will permit the lidding of boxes at a relatively fast rate.

The manner of accomplishing the foregoing object, as well as further objects and advantages, will be made manifest in the following description taken in connection with the accompanying drawings, in which:

Fig. 1 is a front elevational view of a box lidding machine embodying a preferred form of my invention.

Fig. 2 is a side elevational view of Fig. 1.

Fig. 3 is a diagrammatic rear elevational view of Fig. 1 with the machine in the act of lidding a box.

Fig. 4 is a view similar to Fig. 3, with the machine in the act of ejecting a box which has just been lidded.

Fig. 5 is an enlarged fragmentary view of a portion of Fig. 2 illustrating the control mechanism of the invention positioned to cause a box to be elevated in the lidding machine.

Fig. 6 is a fragmentary front elevational view of a portion of Fig. 5.

Fig. 7 is a view similar to Fig. 5 showing the control means positioned as during a lidding operation.

Fig. 8 is an enlarged horizontal sectional view of the control means taken on the line 8—8 of Fig. 1.

Fig. 9 is a fragmentary horizontal sectional view of the control means taken on the line 9—9 of Fig. 2.

Fig. 10 is a fragmentary enlarged front elevational view taken in the direction of the arrow 10 in Fig. 8.

Fig. 11 is an enlarged horizontal sectional view taken on the line 11—11 of Fig. 10.

Fig. 12 is a diagrammatic horizontal sectional view taken on the line 12—12 of Fig. 4 and illustrating the manner in which the ejector dog of my invention engages the box in discharging this from the lidding machine.

The preferred embodiment of my invention illustrated in the drawings comprises a lidding machine 15 which includes a frame 16, a box elevator 17, a lid positioning and nailing mechanism 18, and a control mechanism 19 for controlling the operation of the elevator 17, the lid positioning and nailing mechanism 18, and certain box stop and ejecting mechanisms embodied with the elevator 17 and described hereinafter.

The frame 18 has a base 20 including feet 21 formed of heavy angle iron and which are connected by heavy cross plates 22 and have channel beam standards 23 extending upwardly therefrom. Upper portions of the standards 23 are connected by suitable angle iron connecting bars 27 and 28.

The box elevator 17

The box elevator 17 includes a hydraulic cylinder 30 into the chamber 31 of which is fitted a plunger 32. The cylinder 30 has an outer shell 33 formed thereon which shell is welded to inner faces of the plates 22 in order to rigidly mount the elevator 17 on the frame 16. The space between the cylinder 30 and the shell 33 provides a reservoir chamber 34.

Certain connections are made with the cylinder 30 and the shell 33 for the purpose of controlling the operation of the machine 15, these connections being described hereinafter in connection with the control mechanism 19.

The elevator 17 also includes a conveyer 40 which is mounted on the upper end of the plunger 32, this conveyer being of substantially the same type as that disclosed in my copending application for U. S. Letters Patent, Ser. No. 468,680, filed July 17, 1930.

The conveyer 40 includes an anvil frame 41 on which is yieldably mounted a roller frame 42 carrying rollers 43. The conveyer 40 also has double automatic stops 45 which operate in substantially the same manner as corresponding stops shown in the above mentioned copending application.

Positioned to deliver boxes to and receive boxes from the conveyer 40 when this is in its lowermost position, are feed and discharge conveyers 50 and 51.

Mounted on the anvil frame 41 of the conveyer 40 and extending rearwardly therefrom is a pair of members 55 upon which are mounted a pair of rollers 56 (see Fig. 2) which engage with the forward flanges of the channel standard members 23 so as to guide the conveyer 40 during its vertical movement with the elevator 17.

Also mounted on the rear of the anvil frame 40 by suitable spacers is a vertical plate 60 upon the upper edge of which is mounted a box guide 61. Formed in the plate 60 is a slot 62 and mounted on the forward face of this plate adjacent upper and lower edges of this slot are flanged rollers 63 in which an ejector bar 64 is adapted to slide horizontally. The box ejector bar 64 is part of a box ejecting apparatus 65 which is similar in construction to that shown in my copending application for U. S. Letters Patent, Ser. No. 526,927, filed April 1, 1931. As shown in Fig. 12, the bar 64 has a spring urged dog 66 mounted on a forward face thereof. Pivotally mounted at its lower end on the frame angle iron 28 is a yieldable link 70 having a compression spring 71, the opposite end of this link being pivotally connected to the ejector bar 64 as clearly shown in Figs. 3 and 4. Also provided on one of the standards 23 and connected to the yieldable link 70 is a tensile spring 73 the purpose of which will become evident hereinafter.

*The lid positioning and nailing mechanism 18*

This mechanism is mounted upon a pair of supports 76 which are preferably welded onto the standards 23 and extend forwardly therefrom. Mounted for free rotation between a pair of brackets 77 secured underneath the supports 76 is a pair of lid guiding rollers 78. Secured to the supports 76 so as to extend downwardly and inwardly therefrom beneath the rollers 78 is a pair of spring latches 79 for receiving and supporting a lid 80 as shown in Fig. 1. Forward ends of the supports 76 are connected as by a bar 82.

Fixed to inner faces of each of the supports 76 is a battery of nailing chucks 83 which are provided with hammers 84, the latter being rigidly connected at their upper ends to a reciprocating frame 85. The frame 85 is slidably mounted on the standards 23 and adapted to be operated by a pair of pitmans 86 which connect to cranks 87 fixed on a shaft 88, this shaft being journalled in suitable bearings mounted upon the frame 16.

Operation of the hammers 84 is accomplished by a single reciprocation of the frame 85 which, of course, results from a single rotation of the shaft 88. This is adapted to be effected by a single revolution clutch 90 which is connected with a suitable source of power (not shown).

Mounted between lower inner edges of the supports 76 and upon the cross bars 82 is an adjustable curvature crown plate 91 which is of the type shown in my copending application for U. S. Letters Patent, Ser. No. 452,062, filed May 16, 1930.

*Control mechanism 19*

The clutch 90 is controlled by a pull rod 92 which connects to the upper end of an arm 93 of a bell crank foot pedal 94. The arm 93 has a lug 95 formed thereon as shown in Fig. 10, upon which is pivotally mounted an abutment dog 96 which is adapted to rest in either of the full line and dotted line positions in which it is shown in Fig. 10.

Extending forwardly from the abutment dog 96 is a finger 98 by which the dog 96 is adapted to be moved between its two positions noted. Also provided on the dog 96 is a stop lug 99 which engages the arm 93 when the dog is in its dotted line position.

The pedal 94 is adapted to be pivotally operated about a control shaft 110, which, with a shaft 111, is pivotally mounted in bearings 112 and 113 (Fig. 3) on front faces of the cross plates 22. Fixed on the right hand ends of the shafts 110 and 111 are foot pedals 116 and 117 respectively, and on the left hand ends of these shafts are fixed respectively control arms 118 and 119, the relative positions of the pedals and arms on these shafts being clearly shown in Figs. 5 and 7. Coiled about the shaft 111 and secured at its opposite ends to the bearing 113 and to a collar 120 secured on the shaft 111 is a spring 121 (Figs. 1 and 8) which tends to rotate this shaft so as to swing the pedal 117 and control arm 119 upwardly.

The control mechanism 19 also includes a pump 130 which is continuously rotated by the same power means, (not shown) which is used to actuate the clutch 90. The pump 130 has an intake pipe 131 which connects with the lower end of the reservoir 34 as clearly shown in Figs. 1, 2, and 8.

Provided on the shell 33 at its lower end and connecting with the lower end of the cylinder 30 is a check valve 133 as shown in Figs. 2 and 9. This valve has a stem 134 which if depressed opens the check valve 133 and permits fluid to flow outwardly from the cylinder chamber 31 through this valve. When this stem is not depressed, fluid is free to flow through valve 133 into the cylinder chamber 31 but cannot return outwardly therethrough. Connecting with the upper end of the reservoir 34 is a control valve 135 having a stem 136 which is normally spring pressed into open position, but which when depressed closes the valve. Connecting the valve 133 with the valve 135 is a large diameter pipe 140 which is connected to the exhaust end of the pump 130 by a pipe 141.

Also connecting with the pipe 140 is a pipe 145 which extends behind the shell 33 and connects with the rear end of a hydraulic control cylinder 146, which, as shown in Figs. 8 and 11, is welded to the shell 33. The control cylinder 146 has a cylinder chamber 147 which is connected to the reservoir 34 by a passage 148.

Threadedly received in the front end of the chamber 147 is a packing plug 150 having a bore 151 and formed at its inner end to cooperate with rings 152 and 153 to form suitable stuffing boxes 154 and 155 about the bore 151 and between the plug 150 and the cylinder chamber 148. Also fixed in the chamber 148 is a stop bar 158. Extending through the bore 151 is a piston rod 160 of a control plunger 161 which has a head 162. Disposed between the plunger head 162 and the rings 152 and 153 of the stuffing boxes 154 and 155 are coil compression springs 163 and 164, the purpose of which will be made manifest hereinafter.

The cylinder 146 is so positioned on the shell 33 that when the dog 96 is in its dotted line position, as shown in Fig. 10, the rod 160 is in alignment with this dog, and when the dog 96 is in its full line position, as shown in Fig. 10, the rod 160 is out of alignment therewith.

Pivoted on the one of the plates 22 as shown in Figs. 5 and 7 is a bell crank 165 having an eye 166 formed in its upper end, this bell crank being so mounted that a lower arm 167 thereof will engage the stem 134 and open the valve 133 when the bell crank 165 is rotated in a clockwise direction. Connecting the bell crank 165 and the upper end of the control arm 118 is a link 169.

Pivoted on a bracket 182 provided on the valve 135 is a valve operating lever 183, the front arm of this lever being disposed in alignment and adjacent to the stem 136 of the valve 135. As clearly shown in Figs. 5, 6 and 7, the front end of the lever 183 has a pin 184 which extends through a slot 185 of a link 186, the lower end of which is pivotally connected to the control arm 119. Also pivotally mounted on the pin 184 is a yoke latch 188, the lower portion of which is adapted to engage in a notch 189 formed in the inner edge of the link 186, when the link 186 is in its uppermost position relative to the pin 184. Provided on the lower end of the latch 188 is a swivel lug 192.

Hanging from the rear end of the arm 183 is a link 195 having an eye 196 on its lower end, this eye being approximately opposite the eye 166 of the bell crank 165.

Fixed upon the shaft 88 is an eccentric 197 having a band 198 from which a rod 199 extends so as to pass through the eyes 196 and 166. Suitable collars 210 are provided on the rod 199 to position the eye 196 longitudinally thereon. The rod 199 has an end portion thereof machined away to provide a shoulder 211 thereon.

Pivotally connected to the front end of the rod 199 is a link 220 which extends forwardly through the swivel lug 192 and receives lock nuts 221 to confine a coil spring 222 between a base shoulder 223 of the rod 220, and the lug 192.

*Operation*

The operation of the apparatus 15 embodying my invention begins with the elevator 17 positioned as shown in Fig. 1, the reservoir 34 having previously been filled with a suitable liquid, such as light lubricating oil, and the power means for continuously rotating the clutch drum 90 and continuously operating the pump 130 having been set in motion.

At this time the control mechanism 19 is in its normal condition such as it returns to at the end of each box lidding operation, this condition being shown in Fig. 2. In this condition it is seen that pedals 94 and 117 are up and pedal 116 is down. Attention is called to the fact that the reason for pedal 116 being down in Fig. 2 is that the eye 166 of the bell crank 165 has been engaged by the shoulder 211 on the rod 199 so as to swing the bell crank 165 and depress the stem 134 of the valve 133, thereby opening the latter. As the pedal 117 is in raised position at this time, the lever 183 is lifted so as not to depress the stem 136 of the valve 135. With both the valves 133 and 135 open a free passage is provided between the chamber 31 and the reservoir 34, this passage being through these valves and the pipe 140.

The continuous operation of the pump 130 normally maintains a circulation of oil from the reservoir 34 through the pipe 131 to the pump and back to the reservoir 34 through the pipes 141 and 140 and valve 135 which is always open when the stem 136 thereof is not depressed as shown in Fig. 5.

A box 250 crown packed with fruit 251 is now permitted by the operator to pass from the conveyer 50 onto the conveyer 40 of the elevator 17, this box being received, of course, by the rollers 43. The manner in which this box is received on this elevator and positioned by the stops 45 is clearly explained in my copending application, Ser. No. 468,680 referred to hereinabove.

While the machine 15 is shown as devoted entirely to the nailing of lids on boxes it is to be understood that my invention may be used equally well with lidding machines embodying strappers as shown in my application for U. S. Letters Patent, Ser. No. 554,211, filed July 31, 1931, or it may be equally well used with a machine devoted exclusively to the application of straps to boxes already lidded.

It is further to be noted that while I have not shown any device on the machine 15 for tucking the fruit 251 inward from the sides and ends of the box 250, the apparatus of the present invention may be advantageously used in combination with a lid applying and strapping machine including such tucking means. Suitable tucking means of the types referred to are shown in my copending applications for U. S. Letters Patent, Ser. No. 501,285, filed Dec. 10, 1930; Ser. No. 515,509, filed Feb. 13, 1931; and Ser. No. 554,212, filed July 31, 1931.

When no tucking means are used the operator usually presses the fruit 251 downward along the inside of the edges of the box 250 and after placing a lid 80 in position as shown in Figs. 1 and 2, steps on the pedal 117, depressing this to the floor as shown in Fig. 5. For full automatic operation of the machine it is necessary that the dog 96 be in its dotted line position as shown in Fig. 10, and it is assumed that the dog is so positioned at this time.

Depression of the pedal 117 rocks the shaft 111, swinging arm 19 downward and pulling with the latter the link 186 which has in it the notch 189. This also pulls down the latch 188 by virtue of the latter engaging in the notch 189 so as to swing the lever 183 to the position in which it is shown in Fig. 5. This depresses the stem 136, shutting off the valve 135, and lifts the link 195 so that the eye 196 engages the rod 199 and disengages the shoulder 211 thereof from the eye 166 of the bell crank 165 permitting this bell crank to rock in an anti-clockwise direction, thus releasing the stem 134 of the valve 133 and causing this valve to assume the character of an automatic check valve which permits fluid to pass into the lower end of the elevator cylinder chamber 31 but will not permit fluid to pass outward therefrom. It is also noted that the swinging of the bell crank 165 from the position in which it is shown in Fig. 2 to the position in which it is shown in Fig. 5 moves link 169 and arm 118 to rock shaft 110, thereby raising the foot pedal 116 from the floor.

The closing of the valve 135 as just described shuts off the path of the normally free circulation of fluid by the pump 130 to and from the reservoir 34 and results in fluid pumped by the pump 130 being forced through the check valve 133 into the lower end of the cylinder chamber 31 which causes the elevator 17 to rise, thus lifting the box 250 towards the lid 80 and the lid securing mechanism 18. In the upper part of this movement the pressure of the fruit 251 against the lid 80 causes this to conform to the crown sheet 91 and the ends of the box 250 finally compress the opposite ends of the lid 80 against lower faces of the nail chucks 83. At the instant upward movement of the elevator 17 is halted by this engagement with the nail chucks 83 the pressure of the oil in the pipe 140 begins to increase rapidly.

Referring now to Figs. 8 to 11 inclusive, it is to be noted that the springs 163 and 164 are of such a degree of resiliency and are so compressed against the plunger 162 by the plug 150, that the normal fluid pressure existing in the pipes 140 and 145 when a box is being elevated is insufficient to overcome the pressure of these springs against the plunger 162 and move this out of contact with the stop bar 158.

The springs 163 and 164, however, are adapted to be overcome by a pressure slightly in excess of that used in elevating the box 250 so that as soon as upward movement of the elevator is halted by contact with the chucks 83, the increase of pressure in the nailing mechanism control cylinder 146 quickly thrusts the plunger 161 forward so that the plunger rod 160 engages the dog 96 and swings the arm 93 forwardly as shown in Fig. 7. This pulls on the rod 92 so as to trip the clutch 90 and cause it to rotate the shaft 88 a single revolution.

As before described, a single revolution of this shaft brings the nail drivers 84 down and up through a complete cycle of operation so as to nail the lid 80 on a box 250.

As the shaft 88 rotates, the eccentric 197 is turned into the position in which it is shown in Fig. 7, which withdraws the latch 188 from engagement with the notch 189 of the link 186, thus releasing the lever 183 from this link and permitting it to rise to normal position as shown in Fig. 7 under pressure of the stem 136, which results in the valve 135 being opened. This has two results, the first of which is to lower the eye 196, permitting the shoulder 211 of the rod 199 to drop into position back of the lower edge of the eye 166 of the bell crank 165 as shown in Fig. 7 so that on the return of the eccentric 197 to normal position as shown in Fig. 2, the stem 134 of the valve 133 will be depressed, thereby re-establishing the free exhaust passage of oil from the elevator cylinder chamber 31 to the reservoir chamber 34. Opening of the valve 135 also has the immediate result of lowering the pressure in the nailing means control cylinder 146 so that the springs 163 and 164 return the plunger 161 to its normal position as shown in Fig. 11 and thus allow the arm 93 of the bell-crank foot pedal 94 to be swung back to its normal upright position as shown in Fig. 5 at the completion of the single revolution of the shaft 88 and preventing the automatic tripping of the clutch 90 for a second revolution.

It is now to be noted that the excess pressure of the elevator 17 against the box 250 due to the compressing of the lid 80 between this box and the chucks 83 results in the depression of the roller frame 42 to bring the ends of the box 250 into contact with the anvil frame 41 during the nailing operation. As clearly pointed out in my copending application, Ser. No. 468,680 and referred to hereinabove, this depression of the roller frame 42 results in the stops 45 being lowered and shifted inwardly beneath the ends of the box 250 so that these stops no longer are able to block movement of the box 250 on the conveyer 40.

The position of the box at this moment is clearly shown in Fig. 3, which also shows that the upward movement of the elevator 17 has caused the bar 64 to slide to the left (viewing the machine from the rear) with the yieldable link 70 disposed almost vertically.

As above described, rotation of the shaft 88 to accomplish the nailing operation opens a free passage for oil from the elevator cylinder chamber 31 to the reservoir chamber 34 and permits the elevator 17 to drop downwardly at once. In this downward movement the yieldable link 70 tends to move the ejector bar 64 back to its normal position, as described in my copending application, Ser. No. 526,927, referred to hereinabove, so that the dog 66 on the ejector bar 64 engages the box 250 and ejects this box onto the discharge conveyer 51 positioned as shown in Fig. 1 to receive the box. It is thus seen that the operation of the nailing means 18, the stops 45, the return movement of the elevator 17, and the ejector 65, are all automatically accomplished incidental to the pedal controlled lifting of the box 250 on the elevator 17.

It is also to be noted that the operations automatically accomplished as above noted take place without it being necessary for the operator to lift his foot from the foot pedal 117 when the box has reached its upwardmost limit of movement. This makes it unnecessary for any particular skill to be exercised in lifting the foot from the pedal 117, as this pedal may be held down as long as desired without anything happening except the desired automatic functions already described.

When the pedal 117 is released from the position in which it is shown held down in Fig. 7, the spring 121 rotates the shaft 111 so as to swing the pedal 117 and the control arm 119 upwardly into the positions in which these are shown in Fig. 2, whereupon the spring 222 snaps the latch 188 forwardly into its normal position in the notch 189.

The control mechanism 19 is now in its original condition as shown in Fig. 2. The first box having been lidded and ejected from the conveyer 40, another box 250 is now drawn from the conveyer 50 onto the conveyer 40 and lidded by the same sequence of operations as described hereinabove for the first box 250.

It is thus seen that I have produced a box lidder which permits complete control by the operator of the pressing of the lid against the box, but which, when this pressing is completed, moves the box stops out of the way, nails the lid to the box, lowers the box back to the level of the receiving and discharge conveyers, and ejects this box onto the discharge conveyer. The control of the elevator 17 is such that while this is rising, if the foot is lifted from the pedal 117, the valve 135 is permitted to open by the rising of the stem 136 thereof so that oil from the pump 130 is not forced through the check valve 133 into the lower end of the elevator cylinder 30, but instead is discharged through the valve 135 into the reservoir chamber 34. Whenever the foot pedal 117 is depressed, however, to cause the elevator 17 to rise, the lever 183 is rocked as shown in Fig. 5 so as to lift the rod 199 and disengage the shoulder 211 of this from the bell crank 165, permitting this to turn anti-clockwise as shown in that figure, and release the stem 134 of the check valve 133. Thus it is, that if at any time during the lifting of the elevator 17 the foot pedal 117 is allowed to rise, the check valve 133 is operative to prevent the exhaust of oil from the elevator cylinder 30, thus retaining the elevator 17 in the position in which it is at that time.

To elevate the elevator 17 further it is only necessary to again depress the pedal 117, and in case it is desired to lower the elevator, either a slight distance or clear to its lowermost position, the pedal 116 is depressed so as to force the stem 134 of the check valve 133 downwardly and permit the escape of a portion of the oil in the cylinder 30.

It is obvious, from an inspection of Fig. 10, that when the dog 96 is swung into its dotted line position the nailing mechanism will operate responsive to the compressing of a lid between the box and the nail chucks. When this dog is in its full line position, however, as shown in Fig. 10, the functioning of the control cylinder 146 is entirely without effect.

What I claim is:

1. In combination: nailing chucks; means for elevating a box towards said chucks to press a lid on said box; nailing means operable independently of said elevating means to nail said lid to said box when it is so pressed; and control means responsive to said nailing means to automatically lower said elevating means when said nailing function has been performed.

2. In combination: nailing chucks; means for elevating a box towards said chucks to press a lid on said box beneath said chucks; means for manually controlling said elevating means to cause it to elevate at will; check means to automatically retain said elevating means in lifted position when said control means is released; nailing means operable to nail said lid to said box when it is so pressed; and control means responsive to said nailing means to automatically release said elevating means from said check means when said nailing operation is accomplished.

3. In combination: nailing chucks; means for elevating a box towards said chucks to press a lid on said box; nailing means operable independently of said elevating means to nail said lid to said box when it is so pressed; ejecting means adapted to eject a box from said elevating means; and control means responsive to said nailing means to automatically cause said elevating means to be lowered and said ejecting means to eject said box from said elevating means immediately upon the completion of the lidding of said box by said nailing means.

4. In combination: nailing chucks; a fluid power means; a fluid power responsive means for elevating a box towards said chucks to press a lid on said box; nailing means associated with said chucks; and a second fluid power responsive means connected with said fluid power means for automatically effecting the operation of said nailing means when said lid is so pressed.

5. In combination: nail chucks; means for elevating a box towards said chucks to press a lid on said box; nailing means associated with said chucks; manual control means for operating said elevator at will to lift said box as aforesaid; automatic means operating, when the lid is pressed as aforesaid, to cause said nailing means to nail said lid to said box; and automatic means to release said elevating means from said manual control means and permit said box to be lowered.

6. In a machine of the character described, a vertically movable table, nailing means overlying said table, hydraulic means for controlling the movement of said table, and valve mechanism for controlling said hydraulic means, said valve mechanism comprising a pair of valves, one of which is a normally closed check valve and the other valve being normally open, a conduit interconnecting said valves and communicating with said hydraulic means, and means for delivering fluid under pressure into said conduit at a point between said valves, whereby said table can be raised by closing said normally open valve, lowered by opening said normally closed check valve and stopped at any intermediate position by restoring both valves to normal position.

7. In a machine of the character described, a vertically movable table, nailing means overlying said table, hydraulic means for controlling the movement of said table, and valve mechanism for controlling said hydraulic means, said valve mechanism comprising a pair of valves, one of which is a normally closed check valve and the other valve being normally open, a conduit interconnecting said valves and communicating with said hydraulic means, and means for delivering fluid under pressure into said conduit at a point between said valves, whereby said table can be raised by closing said normally open valve, lowered by opening said normally closed check valve and stopped at any intermediate position by restoring both valves to normal position, and means automatically responsive to completion of a nailing operation to actuate said valves to effect lowering of the table.

8. In a cover nailing machine the combination of: cover nailing means; fluid power means to cause a cover to be pressed onto a box in proper position to be nailed thereto by said nailing means; valve means for manually controlling application of fluid pressure, created by said fluid power means, to cause a cover and box to be positioned as aforesaid; additional valve means for causing said cover and box to be retained in said position during the nailing operation; and means automatically actuating said additional valve means to release said box and cover upon completion of said nailing operation.

9. In a cover nailing machine the combination of: cover nailing means; fluid power means to cause a cover to be pressed onto a box in proper position to be nailed thereto by said nailing means; valve means for manually controlling application of fluid pressure, created by said fluid power means, to cause a cover and box to be positioned as aforesaid; additional valve means for causing said cover and box to be retained in said position during the nailing operation; means automatically actuating said additional valve means to release said box and cover upon completion of said nailing operation; and means associated with said first mentioned valve means, and operative when the latter is again manually actuated, to release said additional valve means from its aforesaid automatic actuating means.

HALE PAXTON.